US012398020B2

(12) United States Patent
Wagenleitner et al.

(10) Patent No.: US 12,398,020 B2
(45) Date of Patent: Aug. 26, 2025

(54) PEOPLE-TRANSPORTING SYSTEM HAVING A GUIDE MEANS IN THE ENTRY REGIONS

(71) Applicant: INVENTIO AG, Hergiswil (CH)

(72) Inventors: Georg Wagenleitner, Roßleithen (AT); Stefan Görcs, Kútniky (AT); Gerhard Kleewein, Pressbaum (AT)

(73) Assignee: Inventio AG, Hergiswil (CH)

( * ) Notice: Subject to any disclaimer, the term of this patent is extended or adjusted under 35 U.S.C. 154(b) by 87 days.

(21) Appl. No.: 18/568,545

(22) PCT Filed: Jun. 1, 2022

(86) PCT No.: PCT/EP2022/064858

§ 371 (c)(1),
(2) Date: Dec. 8, 2023

(87) PCT Pub. No.: WO2022/263170

PCT Pub. Date: Dec. 22, 2022

(65) Prior Publication Data

US 2024/0270540 A1 Aug. 15, 2024

(30) Foreign Application Priority Data

Jun. 16, 2021 (EP) .................................... 21179815

(51) Int. Cl.
*B66B 31/00* (2006.01)
*B66B 23/14* (2006.01)
(Continued)

(52) U.S. Cl.
CPC ............ *B66B 31/006* (2013.01); *B66B 25/00* (2013.01); *B66B 23/14* (2013.01); *B66B 23/24* (2013.01); *B66B 29/08* (2013.01)

(58) Field of Classification Search
CPC ....... B66B 25/00; B66B 31/006; B66B 23/14; B66B 23/24; B66B 29/08
(Continued)

(56) References Cited

U.S. PATENT DOCUMENTS

| | | | | |
|---|---|---|---|---|
| 5,542,521 A * | 8/1996 | Meyer | B66B 31/006 | 198/324 |
| 6,138,815 A * | 10/2000 | Reiners | B66B 31/006 | 198/321 |
| 6,942,088 B1 * | 9/2005 | Reiners | B62B 3/1404 | 198/465.1 |

FOREIGN PATENT DOCUMENTS

| | | | |
|---|---|---|---|
| DE | 202006018899 U1 * | 3/2007 | B66B 29/08 |
| EP | 1076031 A1 | 2/2001 | |

(Continued)

OTHER PUBLICATIONS

International Search Report for International Application No. PCT/EP2022/064858 dated Aug. 18, 2022.

*Primary Examiner* — James R Bidwell
(74) *Attorney, Agent, or Firm* — Knobbe, Martens, Olson & Bear, LLP

(57) ABSTRACT

The disclosure relates to a passenger transport system which is designed as a moving walkway or escalator. The passenger transport system has two access regions and a conveyance region, each of the two access regions having a walking-accessible surface. At least one of the walking-accessible regions is provided with a guide device for guiding and channeling users with different needs, wherein the guide device comprises tactile elements whose planar arrangement in the access region divides the walking-accessible surface into a first corridor with tactile elements and a second corridor without tactile elements. The two corridors
(Continued)

are arranged next to each other and extend over the walking-accessible surface in a direction of conveyance of the passenger transport system.

19 Claims, 4 Drawing Sheets

(51) Int. Cl.

| | |
|---|---|
| ***B66B 23/24*** | (2006.01) |
| ***B66B 25/00*** | (2006.01) |
| ***B66B 29/08*** | (2006.01) |

(58) Field of Classification Search
USPC .................................................. 198/321, 324
See application file for complete search history.

(56) References Cited

FOREIGN PATENT DOCUMENTS

| | | | |
|---|---|---|---|
| EP | 2748097 | A1 | 7/2014 |
| JP | S5326090 | U | 3/1978 |
| JP | H07267560 | A | 10/1995 |
| JP | H11217174 | A | 8/1999 |
| JP | 2006176274 | A | 7/2006 |
| WO | WO 2013/037115 | A1 | 3/2013 |

* cited by examiner

PEOPLE-TRANSPORTING SYSTEM HAVING A GUIDE MEANS IN THE ENTRY REGIONS

TECHNICAL FIELD

The disclosure relates to a passenger transport system which is designed as a moving walkway or escalator, and to the design of its access regions.

SUMMARY

Moving walkways are well-known and efficient passenger transport systems used for transporting users horizontally on the same level of a structure, or with a slight incline up to 12° from a first level to a second level of a structure. In the case of moving walkways, a plurality of pallets is arranged one behind the other in the direction of transport and connected to at least one traction device to form a conveyor belt.

Escalators are used to transport users from a first level to a second level of a structure, the transport usually taking place over steeper gradients of between 30° and 35°. An escalator has a conveyor belt made of traction means and steps arranged one behind the other.

Typical areas of application of passenger transport systems of the aforementioned type are airports, train stations, subway stations, amusement parks, shopping centers and the like. The width of the passenger transport system is selected depending on the expected passenger traffic and the space available for the given application.

Escalators and moving walkways generally have a support structure with two deflection regions, between which the conveyor belt is guided in a continuous manner. Of course, instead of the support structure, there can also be a sufficiently supported rail system through which the conveyor belt can be guided in a circulating manner. Above the deflection regions, there are access regions with a surface which is accessible to walkers, who can embark and disembark from the conveyor belt via this surface. The walking-accessible surface is usually created by floor covering elements that span and cover the mechanics of the deflection regions. Balustrade bases with balustrades, on which circulating handrails are arranged, extend parallel to the transport direction of the passenger transport system on both sides of the conveyor belt. This allows users to hold onto the handrails while moving.

Escalators and moving walkways are passenger transport systems in which the users can also carry transport carts such as shopping transport carts, wheeled suitcases, and the like along with them. While users can walk on the conveyor belt without a transport cart, this is not possible, not permitted or problematic for users with transport carts, since forward walking motion can result in the transport carts scraping the fixed base plates of the balustrade bases during movement on the conveyor belt. When this happens, frictional forces between the base plate and the transport cart produce transverse forces which act on the transport cart in such a way that uncontrollable movements of the transport cart on the conveyor belt can occur. In principle, it is desirable for users to walk on the conveyor belt, since this significantly increases the transport flow of the passenger transport system.

Not every person usually carries a transport cart with them, such that conflicts can arise on the conveyor belt if users want to walk past the transport cart but are prevented from doing so by transport carts that are staggered in their orientation or are placed side by side.

The object of the present disclosure is therefore to prevent the problems on the conveyor belt listed above, and to improve the transport flow of the passenger transport system.

This object is solved by a passenger transport system that has two access regions and one conveyance region. The conveyance region has a circulating conveyor belt which is arranged between the two access regions and connects them to each other. Each of the two access regions has a stationary region accessible to walkers, via which a user can embark or disembark from the conveyor belt. At least one of the walking-accessible surfaces is equipped with a guide device to guide and channel users based on their different needs. The guide device comprises tactile elements. By the planar arrangement of these tactile elements in the walking-accessible surface, the same is divided into a first corridor with tactile elements and a second corridor without tactile elements. In this case, the two corridors are arranged side by side, and extend over the walking-accessible surface in the direction of conveyance of the conveyor belt. In other words, a passenger can embark or disembark from the conveyor belt via a corridor with tactile elements and via a corridor without tactile elements.

The use of tactile elements has been widely used in recent decades to facilitate movement in public spaces for people with visual impairments. Tactile elements are used to mark particularly suitable pathways between important public facilities. These elements can be perceived using a cane. For example, tactile elements are applied directly to asphalt and paved surfaces using filler-enriched paint, leaving permanent raised structures in the form of truncated cones and ledges once the paint is dry. Tactile elements are also manufactured as individual parts and applied to walking-accessible surfaces in predetermined patterns. Furthermore, prefabricated panels are also known which have tactile elements arranged in predefined patterns. Tactile elements are standardized in ISO 23599, for example.

Observations in public space have shown that people with heavy rolling luggage or shopping transport carts avoid areas with tactile elements as much as possible, exit them as soon as possible, or strive to cross them using the shortest possible route. Since these transport carts have very small wheels, the tactile elements cause a high rolling resistance, which, unconsciously, must be overcome as soon as possible—whereas these tactile elements are hardly noticeable when walked over. In other words, surfaces with tactile elements are easy for walkers to pass over but pose a certain obstacle for transport carts with very small rollers or wheels (micro-mobility).

The present disclosure makes use of these observations by using tactile elements to form two corridors in the access regions of the passenger transport system, and thus to guide and channel users with different needs. The use of tactile elements also has the advantage that users with a visual impairment can be guided to the conveyor belt in an ideal manner via the corridor equipped with tactile elements, such that they do not stand between the transport carts on the conveyor belt. Although this is not a problem when embarking on the conveyor belt, it may happen that a user with a transport cart stops briefly in the access region when disembarking from the conveyor belt, and the visually impaired user is conveyed into the stationary transport cart or its user.

In one embodiment of the disclosure, the width of the second corridor is designed with a track width of transport carts permitted on the conveyor belt. This is particularly important in shopping centers with shopping transport carts or in airports and train stations with luggage transport carts, since in these cases, transport carts of the same type are particularly often transported by the users.

In a further embodiment of the disclosure, the first corridor tactile elements adjoining the second corridor are arranged in such a way that they form an entry region of the second corridor, the entry region having an increasing width the further it extends away from the conveyor belt over the walking-accessible surface. In other words, the entry region acts like a funnel for the transport carts as they are pushed through the second corridor of the people transport system.

In a further embodiment of the disclosure, at least a proportion of tactile elements of the first corridor is arranged as an orientation aid in a predetermined surface pattern which contains information. This surface pattern can, for example, indicate the floor number in Braille to users with a visual impairment and/or indicate the direction of travel of the passenger transport system. Of course, a specific arrangement of tactile elements can also form pictograms showing sighted users that they can use the first corridor to get past the transport carts.

Tactile elements can be formed, for example, in the shape of a truncated cone. The top surface diameter of the tactile element is preferably between 12 mm and 25 mm, and its base surface area is 5 mm to 15 mm, preferably 9 mm to 11 mm, greater than the top surface diameter. As a result, the rollers of the transport cart are not completely in contact with the tactile elements, but can run over them, albeit with considerable additional effort. In the case of tactile elements arranged on the edge of the second corridor, the cone flanks of such tactile elements also cause rollers which graze them to slip off, and thus be shunted in the direction of the second corridor. So that the tactile elements do not become a stumbling block for the user, their truncated cone height or element height is between 3 mm and 6 mm, preferably 4 mm and 5 mm.

A tactile element can also be elongate, for example in the form of a strip, with the top surface width of such a tactile element being between 12 mm and 25 mm. In order to achieve the same properties as the tactile elements designed in the shape of a truncated cone, their base surface width is 5 mm to 15 mm, preferably 9 mm to 11 mm, greater than the top surface width, and their strip height or element height is between 3 mm to 6 mm, preferably 4 mm to 5 mm.

If it is known which transport carts are mainly used in the region of the passenger transport systems, the element height can be selected in relation to the roller diameter of the rollers used on the transport cart. Tactile elements with an element height in the range of 2% to 10% of a roller diameter of transport carts allowed on the conveyor belt have shown very good results in terms of their desired effect in the access region of the passenger transport system.

In one configuration, the tactile element can have an attachment region on its base surface, through which the tactile element can be connected to floor covering elements of the passenger transport system, which form the walking-accessible surface. This attachment region can be an adhesive surface, a protruding pin, an internal thread, a through-hole for countersunk screws, and the like.

Since the transport carts are channeled in the second corridor, there is also an increased risk that they can collide with fixed parts of the passenger transport system, such as the balustrade or the balustrade base, since the transport carts are guided very close to them in order to have the widest possible first corridor for walking users. In order to prevent such collisions, a guide device can therefore be arranged in an edge region of the second corridor opposite the first corridor, which guides the transport cart past a balustrade base adjoining the guide device and/or a balustrade of the passenger transport system arranged above the balustrade base. The guide device is designed in such a way that it cannot be run over by the transport cart. The simplest way is to use correspondingly high strips that can be arranged in the edge region of the second corridor.

In a further embodiment of the disclosure, at least one sensor, by means of which it is possible to detect when a transport vehicle passes over the tactile elements, can be arranged in the region of the tactile elements. A wide variety of sensor types such as, for example, inductive sensors, radar sensors, force measuring sensors, TOF cameras, video cameras, sound sensors, vibration-detecting sensors and the like can be used in this case. Their signals are sent to a signal processing unit, and evaluated depending on the sensor type. With sound sensors, the typical rattling noise that occurs when a transport cart drives over tactile elements can be evaluated. In the case of video cameras and TOF cameras, their recorded image signals are processed and evaluated. The signal processing unit can be arranged, for example, in the sensor, or separately from it as a separate component, or it can be present in a controller of the passenger transport system.

The signal processing unit is preferably connected to a controller of the passenger transport system and/or to a communication module. As a result of detected crossings of tactile elements made by transport carts, the controller and/or the communication module can emit warning signals or instructions on how to proceed to the users of the passenger transport system via an output module. Such warning signals or instructions on how to proceed can be, for example, automatically generated announcements such as: "Please use the left-hand side when using a transport cart." Such warning signals or instructions on how to proceed can also be output visually, for example on a screen. Of course, combinations are also possible in this case. In addition, the controller of the passenger transport system can temporarily reduce the speed on the basis of such warning signals, if this is necessary or desired by the operator of the passenger transport system.

To facilitate the guiding and channeling of users with different needs, the tactile elements of the guide device can be provided with a signaling color and/or with a luminous means. The luminous means arranged within the tactile element can be an RGB LED, for example, such that the wavelength of the emitted light can be selected depending on the direction of conveyance of the conveyor belt. Of course, light effects, such as running lights and the like, can also be generated if, for example, each of the tactile elements of the guide device is provided with a light source, and these are activated individually or in groups.

BRIEF DESCRIPTION OF THE DRAWINGS

Preferred embodiments of the disclosure are explained in more detail in the description below with reference to the accompanying drawings, in which corresponding elements are denoted by the same reference numbers, and in which.

DETAILED DESCRIPTION

Figure 1:
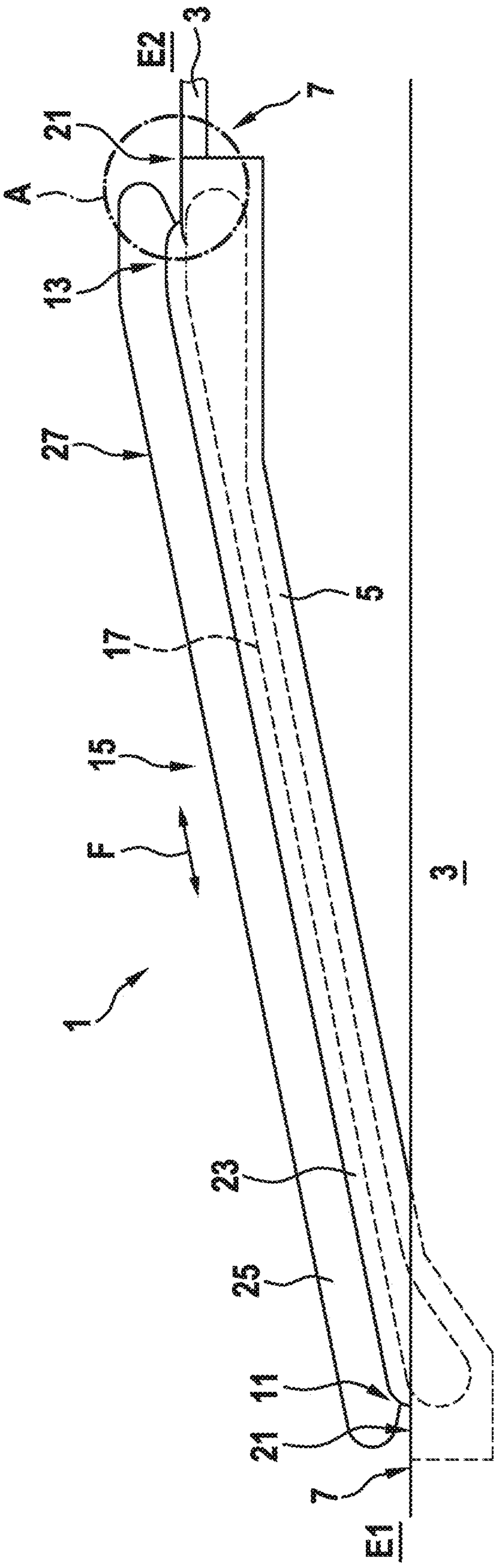
FIG. 1: is a schematic side view of a passenger transport system designed as a moving walkway which connects two levels of a building with each other.
Figure 2:
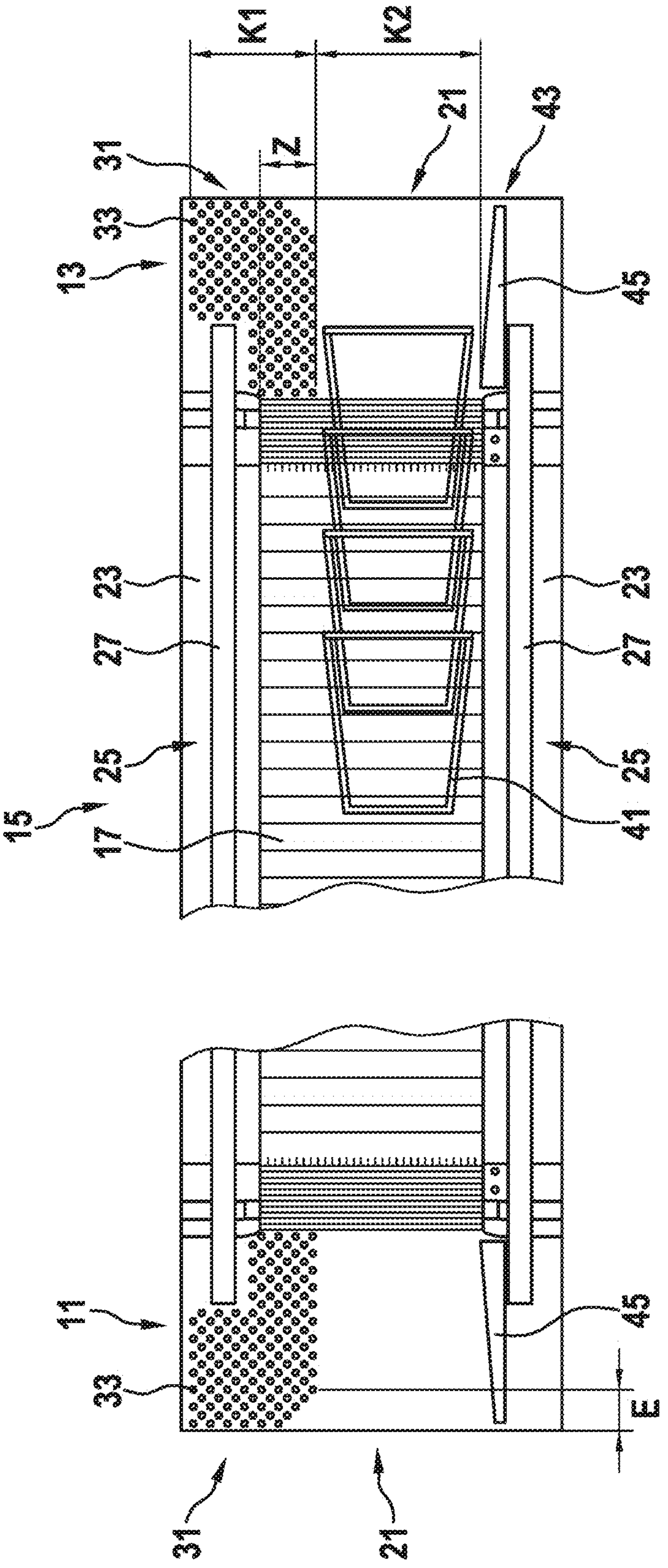
FIG. 2: is a schematic, enlarged plan view of the passenger transport system of FIG. 1, wherein each access region of walking-accessible surfaces has a first embodiment of a guide device.

FIG. 1 is a schematic side view of a passenger transport system 1 designed as a moving walkway which connects a first level E1 to a second level E2 of a building 3. FIG. 2 schematically shows the passenger transport system of FIG. 1 in an enlarged plan view, which is why these two figures are described together below.

In order to connect the two levels E1, E2, the passenger transport system 1 has a stable support structure 5 (only the outlines of which are shown), the ends of which rest like a bridge on the support points 7 of the building 3 provided for them. The passenger transport system 1 can substantially be divided into two access regions 11, 13, and a conveyance region 15 arranged between the two access regions 11, 13. A conveyor belt 17 that can circulate is arranged in the conveyance region 15. The guidance and deflection of the conveyor belt 17, which is usually composed of conveyor chains and pallets, and its drive, are well known and are therefore not shown and described in detail.

The conveyor belt 17 connects the two access regions 11, 13 to each other, with each of the two access regions 11, 13 having a walking-accessible surface 21. Balustrade bases 23 with balustrades 25 extend on both sides of the conveyor belt 17 in order to give the users of the passenger transport system 1 lateral support. The balustrade bases 23 and balustrades 25 are fixed to the supporting structure 5, wherein each balustrade 25 is provided with a circulating handrail 27, which must move synchronously with the conveyor belt 17 in accordance with applicable standards and regulations.

Depending on the defined area of use, the passenger transport system 1 has one or two directions of conveyance F (from level E1 to level E2 and in the opposite direction from level E2 to level E1). The direction of conveyance F thus proceeds from one access region 11 to the other access region 13, or vice-versa. In the present example, as particularly visible in FIG. 2, it can be seen that the passenger transport system 1 shown is provided for both directions of conveyance F, since both access regions 11, 13 and/or their walking-accessible surfaces 21 are provided with a guide device 31 for guiding and channeling users with different needs.

The guide device 31 includes tactile elements 33, the surface arrangement of which in the access region 11, 13 divides the walking-accessible surface 21 into a first corridor K1 with tactile elements 33 and a second corridor K2 without tactile elements 33. The two corridors K1, K2 are arranged next to each other and extend in the direction of conveyance F of the conveyor belt 17 over the walking-accessible surface 21 of the access region 11, 13. FIG. 2 shows a first embodiment of the guide device 31, which differs from the second embodiment described in FIGS. 3 and 4 by having a different surface pattern of the tactile elements 33 and differently designed tactile elements 33, 35.

As can be clearly seen in FIG. 2, the width of the second corridor K2 is designed for a wheel track width of transport carts 41 permitted on the conveyor belt 17. The second corridor K2 is therefore slightly wider than the wheel track width of the transport cart 41, such that the transport cart 41 can easily pass through it. In the first corridor K1, tactile elements 33 in the shape of a truncated cone are arranged in a regular pattern. Due to this specific arrangement, which can also be found in ISO 23599, for example, the area covered with tactile elements 33 identifies itself as a warning area for a visually impaired person and thus contains tactile information. The first corridor K1 narrows in the region of the adjoining balustrade to a passage Z, which users can still easily pass through, even if, as shown, a transport cart 41 is pushed through in the second corridor K2 at the same time.

It can also be seen in FIG. 2 that the tactile elements of the first corridor K1 adjoining the second corridor K2 are arranged in such a way that they form an entry region E of the second corridor K2. This entry region E has a width which increases the further it extends away from the conveyor belt 17 over the walking-accessible surface 21 of the access region 11, 13.

Since the transport carts 41 are channeled in the second corridor K2, there is also an increased risk that they could collide with fixed parts of the passenger transport system 1, such as the balustrade 25 or the balustrade base 23, since the transport carts 41 are guided very close to them in order to provide the widest possible first corridor K1 and/or passage Z for passing users. In order to avoid such collisions, a guide device 45 can therefore be arranged in an edge region 43 of the second corridor K2 opposite the first corridor K1. This guides the transport cart 41 past a balustrade base 23 adjoining the guide device 45 and/or past a balustrade 25 of the passenger transport system 1 arranged above the balustrade base 23. The guide device 45 is designed in such a way that it is very difficult for the transport cart 41 to run over it. The simplest approach is the use of correspondingly tall strips, which are arranged in the edge region 43 of the second corridor K2.

Figure 3:
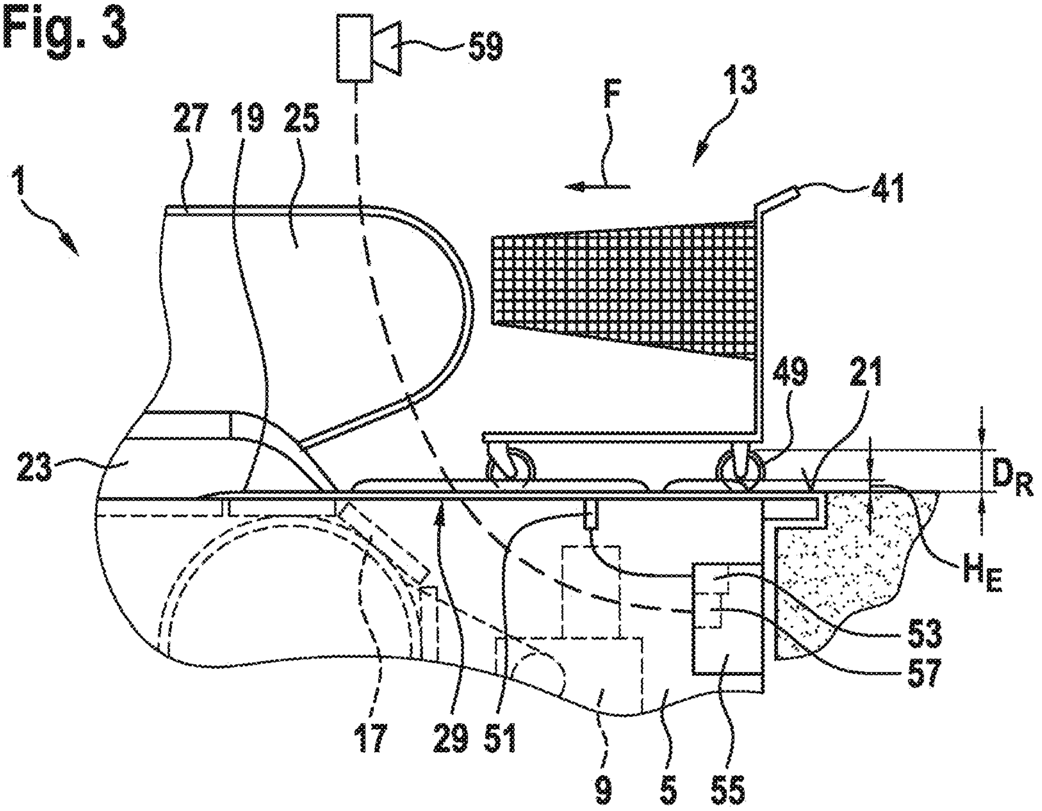
FIG. 3: is a schematic, enlarged side view of the region A indicated in FIG. 1.
Figure 4:
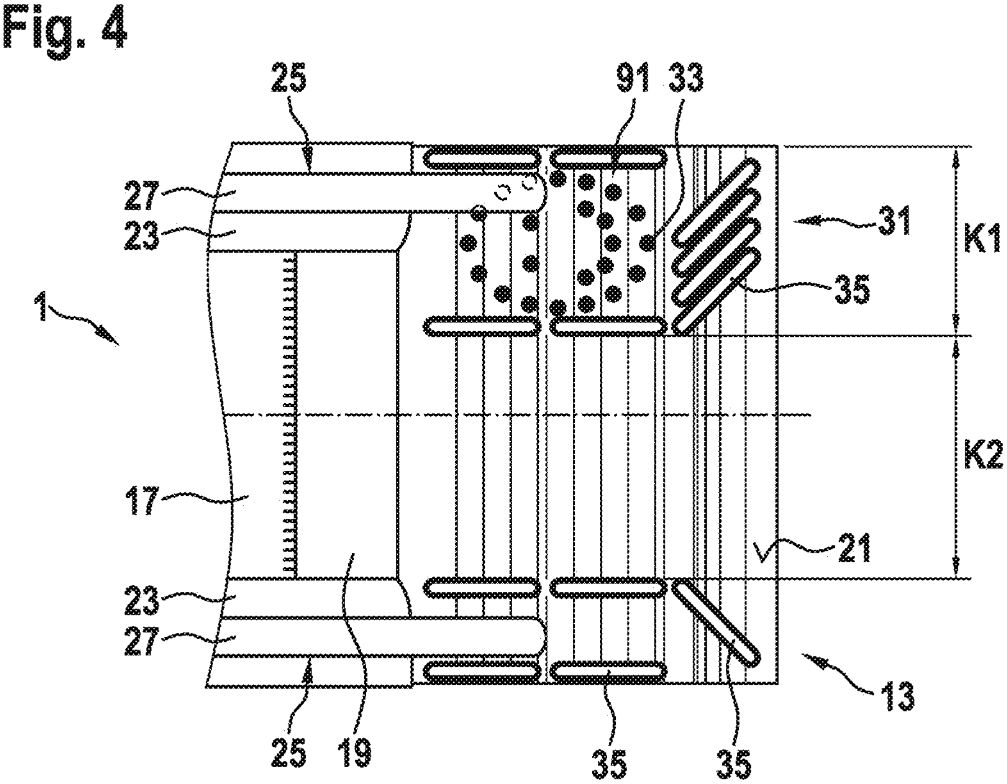
FIG. 4: is a schematic top view of the access region shown in FIG. 3, with a second embodiment of a guide device arranged on the walking-accessible surface thereof.

FIG. 3 shows a schematic, enlarged side view of the region A indicated in FIG. 1, and FIG. 4 shows a schematic plan view of the access region 13 shown in FIG. 3. This is why these two figures are described together below. A second embodiment of a guide device 31 is arranged on the walking-accessible surface 21.

The guide device 31 shown in FIG. 4 has differently configured tactile elements 33, 35. For example, tactile elements 33 in the shape of a truncated cone are arranged on the walking-accessible surface 21 in the first corridor K1 in such a way that they represent a "smiley face" pictogram, to indicate an area which can be used to bypass the transport cart 41. Of course, other pictograms such as arrows or words like "GO" are also possible. In addition, the tactile elements 33, 35 can be optically emphasized by means of a signal color or can be illuminated by luminous means arranged inside the tactile elements 33, 35. As such, at least a proportion of the tactile elements 33 of the first corridor K1 is arranged in a predetermined surface pattern 91 with information content as an orientation aid. The other tactile elements 35 are elongated or strip-shaped and form a very clear demarcation from the second corridor K2. In addition, instead of a guide device 43 (see FIG. 2), elongate tactile elements 35 can also be used to keep the transport cart 41 away from the balustrade 25 and from the balustrade base 23.

The walking-accessible surface 21 of an access region 11, 13 is, as shown in section in FIG. 3, primarily made of plate-like floor covering elements 29 which lie on the support structure 5. The floor covering elements 29 span across the components of the deflection region 9, which are shown with a broken line and which serve the purpose of driving and deflecting the conveyor belt 17. The transition between the movable conveyor belt 17 and the stationary floor covering elements 29 usually forms a comb plate 19, which also belongs to the walking-accessible surface 21. Although the tactile elements 33 are only arranged on the floor cover elements 29 in the present exemplary embodiment, they can of course also be arranged on the comb plate 19.

As can also be seen in FIG. 3, a sensor 51 is arranged in the access region 13; a transport cart 41 passing over tactile elements 33, 35 can be detected by means of the sensor. In the present exemplary embodiment, the sensor 51 detects the structure-borne noise of a floor covering element 29 and relays its sensor signals to a signal processing unit 53. The sensor signals are continuously processed and evaluated in the signal processing unit 53. If a transport cart 41, such as the shopping transport cart shown, rattles over a number of tactile elements 33, 35, these vibrations are detected by the sensor 51. A corresponding evaluation and/or automated vibration analysis of the sensor signals in the signal processing unit 53 can be used to determine whether tactile elements 33, 35 have been driven over. In the present exemplary embodiment, the signal processing unit 53 is integrated into a controller 55 of the passenger transport system 1 which controls the drive motor of the deflection region 9 shown in FIG. 3.

As can be seen in FIG. 3, the signal processing unit 53 is connected to the controller 55 of the passenger transport system 1, and is connected via this controller to a communication module 57. In the present exemplary embodiment, the communication module 57 enables a wireless connection to an output module 59 which is designed as a loudspeaker. As soon as a transport cart 41 passes over tactile elements 33, 35, a warning signal is generated by the signal processing unit 53 or the controller 55, and is relayed to the communication module 57. The communication module 57 can then emit warning signals or instructions on how to proceed via the output module 59 to users of the passenger transport system 1. Of course, very different architectures can be used in this case to achieve the same result. For instance, the sensor 51, the signal processing unit 53 and the output module 59 can form a physical unit, and the communication module 57 can be omitted. Such an "all-in-one" device can be connected solely indirectly to the controller 55 of the passenger transport system 1, for example through a shared power supply.

Since the tactile elements 33, 35 are intended to encourage a user to push their transport cart 41 through the second corridor K2, but without completely blocking use of the first corridor K1 with transport carts 41, the element height $H_E$ of the tactile elements 33, 35 is preferably 2% to 10% of a roller diameter $D_R$ of the rollers 49 of the transport cart 41 permitted on the conveyor belt 17. This increases the rolling resistance when the tactile elements 33, 35 are passed over to a such a degree that the user instinctively switches to the second corridor K2. In addition, when driven over, the tactile elements generate a "rattling" with sufficiently high amplitudes, which the user finds unpleasant. In addition, this "rattling" can be detected very effectively by a sensor 51, and can be better processed in the signal processing unit 53 by filter options which remove operating noise of the passenger transport system 1 and ambient noise.

Figure 5:
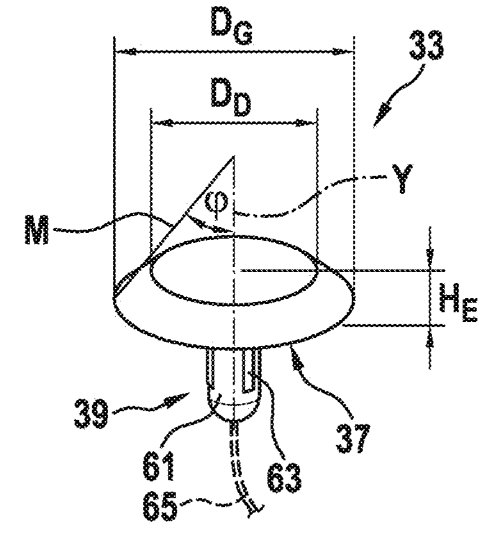
FIG. 5: is a three-dimensional view of a first embodiment of a tactile element.

FIG. 5 shows a three-dimensional view of a first embodiment of a tactile element 33. This tactile element 33 is designed in the shape of a truncated cone, wherein the cone angle φ between a surface line M and the cone axis Y is approximately 45°. The top surface diameter $D_D$ of the tactile element 33 is preferably selected to be between 12 mm and 25 mm, and its truncated cone height or element height $H_E$ is between 3 and 6 mm. Greater element heights $H_E$ are not advisable, due to the increasing risk of tripping. Due to the desired cone angle φ, a base surface diameter $D_G$ of the tactile element 33 depends on the element height, and is therefore 6 mm to 12 mm larger than the top surface diameter $D_D$. Of course, other cone angles φ can also be selected, such that the base surface diameter $D_G$ has a correspondingly different relationship to the top surface diameter $D_D$.

So that the tactile element 33 can be connected to the floor covering elements 29 of the passenger transport system 1, which form the walking-accessible surface 21, it has an attachment region 39 on its base surface 37. The attachment region 39 is formed by the base surface 37 itself and a plastic pin 61 with longitudinal ribs 63. During assembly, a hole with the diameter of the plastic pin 61 is drilled in the floor covering element 29, and the tactile element 33 is pressed in like a nail. The longitudinal ribs 63 are deformed by the narrowness of the bore, such that the plastic pin 61 is stuck in the hole. The tactile element 33 shown is also excellently suitable for being equipped with a sensor 51 or a light source, for example, wherein the electrical connection 65 can be passed through the plastic pin 61 as indicated by the broken line 65.

Figure 6:
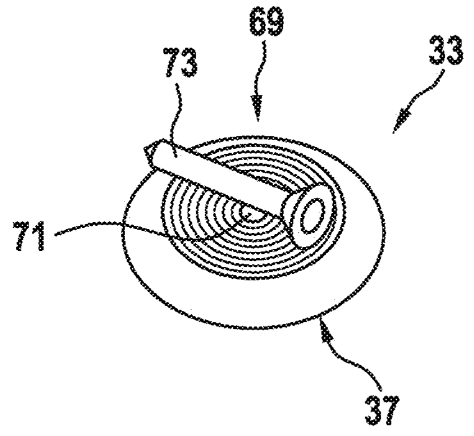
FIG. 6: is a three-dimensional view of a second embodiment of a tactile element.

FIG. 6 shows a three-dimensional view of a second embodiment of a truncated tactile element 33. With the exception of the attachment region 69, it is designed in the same way as the exemplary embodiment in FIG. 5. This exemplary embodiment also has the base surface 37 as the attachment region 69. Instead of a plastic pin, however, a through-hole 71 for a countersunk screw 73 is provided. With this, the tactile element 33 can be screwed to the floor covering element 29.

Figure 7:
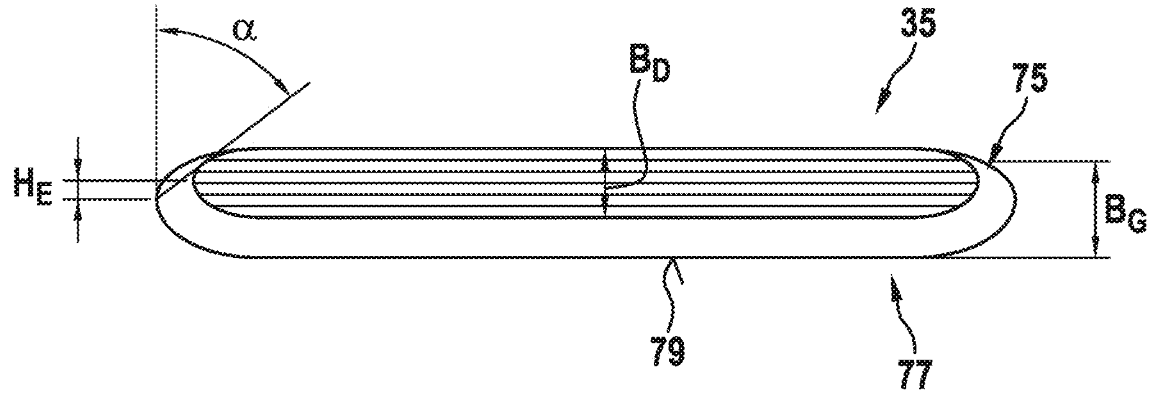
FIG. 7: is a three-dimensional view of a third embodiment of a tactile element.

FIG. 7 shows a three-dimensional view of a third embodiment of a tactile element 35, which is designed to be oblong or elongated or strip-shaped. In analogy to the tactile elements 33 in the shape of a truncated cone, the elongated tactile element 35 has sloping side surfaces 75 which have a flank angle α of approximately 45°. This embodiment also corresponds to the previously described embodiments in terms of the dimensions, such that a top surface width $B_D$ of the tactile element 35 is between 12 mm and 25 mm, and its strip height or element height $H_E$ is between 3 mm and 6 mm. Due to the desired flank angle α, a base surface width $B_G$ of the elongated tactile element 35 is dependent on the element height $H_E$, and is therefore 6 mm to 12 mm greater than the top surface width $B_D$. Of course, other flank angles α can also be selected in this case, in which case the base surface width $B_G$ has a correspondingly different relationship to the top surface width $B_D$. The attachment region 77 of the elongate tactile element 35 comprises its base surface 79, which is adhered to the base covering element 29 by means of an adhesive layer.

Although the disclosure has been described by showing specific exemplary embodiments, it is obvious that numerous further embodiments can be created with the knowledge of the present disclosure, for example, by combining the features of the individual exemplary embodiments and/or interchanging individual functional units of the exemplary embodiments. For example, the elongate tactile element 35 can also be equipped with lighting and/or a sensor 51 and can be provided with a signal color. Moving walkways can of course also be provided with guide devices 31 which extend horizontally over the same level of a structure 3.

The invention claimed is:

1. A passenger transport system configured as a moving walkway or escalator, the passenger transport system comprising:

two access regions; and a conveyance region, wherein the conveyance region comprises a circulating, movable conveyor belt arranged between and connecting the two access regions, wherein each of the two access regions comprises a stationary walking-accessible surface, wherein at least one of the walking-accessible surfaces is equipped with a guide device for guiding and channeling users in accordance with their different conveyance needs, wherein the guide device comprises tactile elements, the planar arrangement of which in the access region divides the walking-accessible surface into a first corridor with tactile elements and a second corridor without tactile elements such that the two corridors are arranged next to each other with respect to a direction of conveyance of the conveyor belt, the two corridors extending at least partially over the walking-accessible surface, and wherein a width of the second corridor is configured for a wheel track width of transport carts permitted on the conveyor belt.

2. The passenger transport system according to claim 1, wherein the tactile elements of the first corridor adjoining the second corridor are arranged such that they form an entry region of the second corridor, wherein the entry region has an increasing width the further it extends away from the conveyor belt over the walking-accessible surface.

3. The passenger transport system according to claim 1, wherein at least a proportion of the tactile elements of the first corridor are arranged in a predetermined surface pattern which, because of the specific arrangement of the tactile elements, presents information as a guide.

4. The passenger transport system according to claim 1, wherein each tactile element comprises a shape of a truncated cone and has a top surface diameter of between 12 mm and 25 mm, a base surface diameter between 5 mm to 15 mm greater than the top surface diameter, and a height between 3 mm to 6 mm.

5. The passenger transport system according to claim 1, wherein the tactile element is elongate and has a top surface width between 12 mm and 25 mm, a base surface width of the tactile element is 5 mm to 15 mm greater than the top surface width, and a element height between 3 mm to 6 mm.

6. The passenger transport system according to claim 4, wherein the element height is between 2% and 10% of a roller diameter of the rollers of transport carts permitted on the conveyor belt.

7. The passenger transport system according to claim 4, wherein the tactile element has an attachment region on its base surface through which the tactile element can be connected to floor covering elements of the passenger transport system which form the walking-accessible surface.

8. The passenger transport system according to claim 1, wherein a guide device is arranged in an edge region of the second corridor opposite the first corridor, which guide device transport carts past a balustrade base adjoining the guide device and/or a balustrade of the passenger transport system arranged above the balustrade base.

9. The passenger transport system according to claim 1, in which at least one sensor is arranged in the region of the tactile elements, the at least one sensor for detecting when a transport cart passes over tactile elements, wherein sensor signals of the at least one sensor can be processed and evaluated in a signal processing unit.

10. The passenger transport system according to claim 9, wherein the signal processing unit is connected to a controller of the passenger transport system and/or to a communication module, wherein, when transport carts are detected in the process of passing over tactile elements, the controller and/or the communication module emit warning signals or instructions on how to proceed via an output module to users of the passenger transport system.

11. The passenger transport system according to claim 1, the tactile elements being provided with a signal color and/or with a luminescence.

12. The passenger transport system according to claim 2, wherein at least a proportion of the tactile elements of the first corridor are arranged in a predetermined surface pattern which, because of the specific arrangement of the tactile elements, presents information as a guide.

13. The passenger transport system according to any of claim 12, wherein each tactile element comprises a shape of a truncated cone and has a top surface diameter of between 12 mm and 25 mm, a base surface diameter between 5 mm to 15 mm greater than the top surface diameter, and a height between 3 mm to 6 mm.

14. The passenger transport system according to claim 13, wherein the element height is between 2% and 10% of a roller diameter of the rollers of transport carts permitted on the conveyor belt.

15. The passenger transport system according to claim 14, wherein the tactile element has an attachment region on its base surface through which the tactile element can be connected to floor covering elements of the passenger transport system which form the walking-accessible surface.

16. The passenger transport system according to claim 15, wherein a guide device is arranged in an edge region of the second corridor opposite the first corridor, which guide device transport carts past a balustrade base adjoining the guide device and/or a balustrade of the passenger transport system arranged above the balustrade base.

17. The passenger transport system according to claim 16, in which at least one sensor is arranged in the region of the tactile elements, the at least one sensor for detecting when a transport cart passes over tactile elements, wherein sensor signals of the at least one sensor can be processed and evaluated in a signal processing unit.

18. The passenger transport system according to claim 17, wherein the signal processing unit is connected to a controller of the passenger transport system and/or to a communication module, wherein, when transport carts are detected in the process of passing over tactile elements, the controller and/or the communication module emit warning signals or instructions on how to proceed via an output module to users of the passenger transport system.

19. The passenger transport system according to claim 18, the tactile elements being provided with a signal color and/or with a luminescence.

* * * * *